UNITED STATES PATENT OFFICE.

ISAAC F. HARRIS, OF BRONXVILLE, AND FREDERICK W. R. ESCHMANN, OF YONKERS, NEW YORK, ASSIGNORS TO THE ARLINGTON CHEMICAL COMPANY, OF YONKERS, NEW YORK, A CORPORATION OF NEW YORK.

PROCESS FOR COMPOUNDING GERMS WITH AN ENVELOPING PROTECTIVE MEDIUM.

1,260,899.      Specification of Letters Patent.      Patented Mar. 26, 1918.

No Drawing.      Application filed December 10, 1914. Serial No. 876,477.

*To all whom it may concern:*

Be it known that we, ISAAC F. HARRIS, of Bronxville, county of Westchester, and State of New York, and FREDERICK W. R. ESCH-MANN, of Yonkers, county of Westchester, and State of New York, have invented a new and useful Process for Compounding Germs with an Enveloping Protective Medium, whereby such germs are preserved and sustained in a dormant state of vitality and made better available for internal administration, the following being a full and exact specification of the process and of the product thereof.
The administration of germs is well known as a means of prevention, or of curing, of diseases, but no method of so preparing living germs was heretofore known, enabling such germs, as for instance, the now well-known *Bacillus Bulgaricus*, to be administered by mouth, and yet to preserve their vitality during their passage through the stomach and their capacity to resume their vital activities, growth and propagation, when reaching the organs where it is desired to plant them. This is the object of our invention, and is attained by the process herein set forth, whereby the germs, after being fully developed, are reduced to a dormant state, *i. e.* a condition, in which their vitality is preserved, but their vital activities, *i. e.* growth and multiplication, suspended, and then enveloped with an air and moisture excluding substance, which is also neutral, or inert, *i. e.* not affecting the vitality of the germs, or stimulating their vital activities, and from which they may be liberated to resume their vital activities.

If the germs are to be prepared for internal administration, through the stomach, the enveloping substance must also possess the quality of protecting them against the action of the gastric juice, during their passing through the stomach, and its consistency must be sufficiently reduced by the internal temperature of the body to release the germs under the influence of the peristaltic movements of the intestines.

Taking, for instance, the germ known as "*Bacillus Bulgaricus*", the process is carried on as follows:

First, a culture of the germs is planted in a suitable medium, and then the germs, when fully developed, are separated therefrom. During this process of separation, or thereafter, the germs must be relieved of all moisture, this being a condition of reducing them to a dormant state, and also, to a large extent, to enable the germs to be enveloped with a protective substance, possessing the aforementioned requisite qualities. The removing of substantially all of the moisture, or reducing the germs to a substantially dry condition, is also necessary to avoid the danger of infection by a growth of mold, and also an excessive development of the products of the germs, which have the tendency to decrease, and may even entirely destroy, the vitality of the germs.

The germs may be separated from the culture by a process of filtration, or the whole culture may be reduced to dryness. Any of the usual filtering methods for removing bacteria from culture mediums may be employed. If the germs are so small that they would pass through ordinary filter paper, cloth, etc., as, for instance, the germs of *Bacillus Bulgaricus*, a layer of some inert material, such as freshly precipitated phosphate of lime, may be placed on the filter paper, cloth, etc., or added to the culture, incorporating it thoroughly therewith; or a precipitation of phosphate of lime, or of other inert material, may be formed in the culture, and the mixture then filtered. The phosphate of lime, or other suitable inert material, serve as a medium for retaining the germs though permitting the fluid to pass through the filter.

After the filtering is completed, the residue on the filter is carefully dried, and then reduced to a very fine powder. Then, after determining the vitality of the germs by suitable test methods, this powder—or the similarly powdered culture, previously reduced to dryness—is incorporated in the afore-specified enveloping substance.

Various substances may be used for the enveloping of the separated germs, the only condition being that the substance should be inert—i. e. not affecting the germs, neither stimulating nor depressing their vitality, air and moisture excluding, and not affected by the gastric juice. The use of any hygroscopic substance as the enveloping substance for the germs must be avoided.

The substance, known as petrolatum, answers these requirements, and as in addition thereto, it possesses also the quality of not being affected by the gastric juice, it is also capable of protecting the germs, enveloped therein, against the injurious effects of the gastric juice. A further advantage of petrolatum is that it is rendered sufficiently fluid by the application of moderate heat, which facilitates a thorough enveloping of the germs therewith, and also their release therefrom by the combined effect of the internal heat of the body, and the peristaltic movements of the intestines.

If petrolatum is used as the enveloping substance for the germs, it is heated to about 45 degrees C., and the germs are then added, and thoroughly incorporated therein by mixing and shaking, while the petrolatum is in this fluid condition. The germs thus enveloped in petrolatum remain in their dormant living condition for a long period. Their capacity to resume their vital activities, that is, growing and multiplication, is not affected thereby, and is resumed promptly upon the germs being liberated and placed under conditions favorable to their growth and multiplication.

In the course of this treatment of the germs, they and also the materials, vessels, and all implements must be kept in an aseptic condition, and in the course of the filtration, and of the drying of the germs, they should be protected against their infection with harmful bacteria, spores and the like.

If the germs are to be prepared for internal use, and to be introduced through the stomach, it is preferable to incorporate them in petrolatum, or other fatty substance of suitable consistency, but having a low melting point, so that it may be rendered fluid or semi-fluid at the temperature of the interior of the human body, to enable the germs to be liberated therefrom during the progress of the peristaltic movements of the intestines. The use of petrolatum as the enveloping medium for the germs prepared for internal use is preferable also because it does not produce any detrimental effect upon the digestive organs. Petrolatum is readily tolerated in the most sensitive stomachs, and is also capable of being suitably flavored, for instance by adding thereto sugars or other sweetening agents. Furthermore, petrolatum is also more preferable to be used as the enveloping substance for such germs like *Bacillus Bulgaricus* which are to be planted in the intestinal tract, because of its action as a mild laxative.

The enveloping substance may also be suitably colored to render it more acceptable, the coloring being preferably red, serving then also to neutralize the effect of light upon the germs, light being detrimental to *Bacillus Bulgaricus*, and to other germs as well.

We claim as our invention:

1. The herein described process of reducing germs to a dormant state of vitality, and of preserving them in that condition, the process comprising the following steps: (1) developing a culture of germs in a matrix fluid; (2) separating the germs therefrom, and rendering them substantially dry; (3) enveloping the germs with a neutral, and air and moisture excluding substance, and not affected by the action of the gastric juices; substantially as herein set forth.

2. The herein described process of reducing germs to a dormant state of vitality, and of preserving them in that condition, the process comprising the following steps: (1) developing a culture of germs in a matrix fluid; (2) filtering the culture through a layer of inert material; (3) drying and pulverizing the residue; and (4) incorporating it in a neutral, and air and moisture excluding substance of a low melting point and capable of resisting the action of the gastric juice; substantially as herein set forth.

3. The herein described process for producing a compound of germs, and of a neutral, and air and moisture excluding medium, having a low melting point, and resistant to the action of the gastric juice, preserving the germs in a dormant state of vitality, the process comprising the following steps: (1) developing a culture of germs in a matrix fluid; (2) separating the germs therefrom and rendering them substantially dry; (3) rendering the preserving and protective medium fluid; and (4) depositing the germs therein and shaking the mixture, whereby the germs become enveloped therein; substantially as herein set forth.

4. The herein described process for producing a compound of germs in a dormant state of vitality, and of an enveloping medium, of fatty composition, having a low melting point and capable of protecting the germs against the effects of gastric juice, the process comprising the following steps: (1) developing a culture of germs in a matrix fluid; (2) filtering the culture through a layer of inert material; (3) drying and then pulverizing the residue; (4) rendering the enveloping medium fluid, and (5) incorporating the pulverized residue therein; substantially as herein set forth.

5. A compound of lactic acid producing bacteria and inert material, made substantially dry and reduced to powdered condition, and incorporated in a neutral, air and moisture excluding substance, insoluble in water, having a lower melting point than the temperature of the human body, and inert to gastric acid and body fluids; substantially as herein set forth.

6. A compound of lactic acid producing bacteria and inert material, made substantially dry and reduced to powedered condition, and incorporated in petrolatum; substantially as herein set forth.

ISAAC F. HARRIS.
FREDERICK W. R. ESCHMANN.

Witnesses:
ANNA CARSON,
ELSIE CRAFT.